US012621550B2

(12) United States Patent
Hwang

(10) Patent No.: US 12,621,550 B2
(45) Date of Patent: May 5, 2026

(54) CAMERA MODULE

(71) Applicant: LG INNOTEK CO., LTD., Seoul (KR)

(72) Inventor: Sun Min Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 117 days.

(21) Appl. No.: 18/687,170

(22) PCT Filed: Aug. 24, 2022

(86) PCT No.: PCT/KR2022/012676
§ 371 (c)(1),
(2) Date: Feb. 27, 2024

(87) PCT Pub. No.: WO2023/027510
PCT Pub. Date: Mar. 2, 2023

(65) Prior Publication Data
US 2024/0422415 A1     Dec. 19, 2024

(30) Foreign Application Priority Data

Aug. 27, 2021     (KR) ......................... 10-2021-0114196

(51) Int. Cl.
*H04N 23/54*          (2023.01)
*H04N 23/55*          (2023.01)

(52) U.S. Cl.
CPC ............. *H04N 23/54* (2023.01); *H04N 23/55* (2023.01)

(58) Field of Classification Search
CPC ........ H04N 23/54; H04N 23/55; H04N 23/51; H04N 23/57; H04N 23/40; H04N 23/50;

G02B 7/021; G03B 17/02; G03B 17/12; G03B 30/00; G03B 2217/002; H05K 1/147; H05K 2201/10121; H05K 2201/10151;
(Continued)

(56) References Cited

U.S. PATENT DOCUMENTS

2019/0028620 A1*   1/2019   Park ........................ H04N 23/55
2019/0121050 A1*   4/2019   Park ......................... G02B 7/02

FOREIGN PATENT DOCUMENTS

CN          112073604 A   * 12/2020   ............. H04N 23/50
JP          2019-511874 A     4/2019
(Continued)

OTHER PUBLICATIONS

Supplementary European Search Report dated Nov. 29, 2024 in European Application No. 22861718.9.
(Continued)

*Primary Examiner* — Abdelaaziz Tissire
(74) *Attorney, Agent, or Firm* — Saliwanchik, Lloyd & Eisenschenk

(57)          ABSTRACT
A camera module according to an embodiment of the present invention comprises: a first body including a lens; a second body coupled to the first body; first to third substrates disposed between the first body and the second body; and a first support member and a second support member for spacing the first to third substrates in the optical axis direction, wherein the first support member includes a hole formed in a sidewall thereof, and the second support member includes a protrusion part inserted into the groove of the first support member.

17 Claims, 7 Drawing Sheets

(58) Field of Classification Search
CPC ....... H05K 2201/10371; H05K 9/0033; H05K
9/0024
See application file for complete search history.

(56)                   References Cited

FOREIGN PATENT DOCUMENTS

| KR | 10-2010-0048101 A | 5/2010 |
| KR | 10-2017-0084550 A | 7/2017 |
| KR | 10-2018-0026146 A | 3/2018 |
| KR | 10-2019-0091978 A | 8/2019 |
| KR | 10-2020-0014504 A | 2/2020 |
| KR | 10-2020-0055548 A | 5/2020 |
| WO | 2017/179943 A1 | 10/2017 |

OTHER PUBLICATIONS

International Search Report dated Nov. 25, 2022 in International
Application No. PCT/KR2022/012676.

* cited by examiner

CAMERA MODULE

CROSS-REFERENCE TO RELATED APPLICATIONS

This application is the U.S. national stage application of International Patent Application No. PCT/KR2022/012676, filed Aug. 24, 2022, which claims the benefit under 35 U.S.C. § 119 of Korean Application No. 10-2021-0114196, filed Aug. 27, 2021, the disclosures of each of which are incorporated herein by reference in their entirety.

TECHNICAL FIELD

The present embodiment relates to a camera module. More specifically, the present invention relates to a camera module that minimizes the reduction of component mounting space in a multiple substrate stack structure.

BACKGROUND ART

In general, since camera modules are manufactured in small sizes and are applied to various IT devices such as camera phones, PDAs, smartphones, and other portable mobile communication devices, in recent years, the release of devices equipped with small camera modules is gradually increasing according to various preferences of consumers.

Recently, due to the advancement and automation of vehicle parts, camera modules for image acquisition are being widely used. For such examples, there are camera modules being used in front and rear surveillance cameras, black boxes, and the like.

In addition, as demands for driver convenience and safety increase in the automobile industry, a variety of new technologies are being applied. In particular, technology using cameras is being actively applied by converging with software technology.

Meanwhile, recently, a structure is being studied in which a plurality of substrates being disposed inside the camera module of vehicle camera is provided for lamination. However, when fixing a plurality of substrates using screws, the area of the substrates where the screws are coupled becomes an unusable area, which causes a problem in that component mounting space is reduced. In addition, there is a problem that the time required for the manufacturing process increases due to the screw fastening operation. In addition, there is a problem in that there is a possibility of substrate bending occurring due to excessive torque when fastening screws.

DETAILED DESCRIPTION OF THE INVENTION

Technical Subject

The present embodiment is intended to provide a camera module that minimizes the reduction of component mounting space in a multiple substrate stack structure.

In addition, the present embodiment is intended to provide a camera module that can minimize process time because the process is simplified with a hook fastening structure.

Technical Solution

In order to solve above problems, a camera module according to an embodiment of the present invention comprises: a first body including a lens; a second body being coupled to the first body; a first substrate to a third substrate being disposed between the first body and the second body; and a first support member and a second support member for spacing the first to third substrates in an optical axis direction, wherein the first support member includes a hole being formed in a sidewall thereof, and wherein the second support member includes a protrusion part being inserted into the groove of the first support member.

The first support member may include a first hook being extended from the side wall and contacting one surface of the first substrate, and a second hook being extended from the side wall and contacting one surface of the second substrate.

The second support member may include a third hook being extended from the side wall and contacting one surface of the third substrate.

The first support member includes a connection part connecting two adjacent side walls, wherein a groove being inwardly recessed may be formed at a connection part of the side wall and the connection part.

The second support member includes a connection part connecting two adjacent side walls, wherein at least one of the side walls includes a first locking part being bent inward and in contact with one surface of the second substrate, and a second locking part being bent inward and in contact with one surface of the third substrate, and wherein at least one of the connection parts may include a third locking part being bent inward and in contact with the other surface of the second substrate.

The second support member includes an inclined part being extended from the side wall and formed in an outward direction, wherein the inclined part of the second support member may be caught by a boss being formed by being protruded from the first body.

At least one among the first to third substrates includes a concave part being inwardly recessed on a side surface, wherein at least one of the first support member and the second support member may contact the concave part to inhibit the substrate from being separated.

In order to solve the above technical problem, a camera module according to another embodiment of the present invention comprises: a first body on which a lens is disposed; a second body being coupled to the first body; a plurality of substrates being disposed between the first body and the second body; and a first support member and a second support member separating the plurality of substrates in an optical axis direction, wherein a hook part that presses one side of the substrate in a curved shape toward the inside of the substrate may be included at one end of the first support member and the second support member.

A hole may be formed in the sidewall of the first support member, and the sidewall of the second support member may include a protrusion part being inserted into the hole of the first support member.

The side walls of the first and second support members are bent inward and may include a locking part being in contact with any one among the plurality of substrates.

In order to solve the above technical challenges, a camera module according to another embodiment of the present invention comprises: a first body on which a lens is disposed; a second body being coupled to the first body; a plurality of substrates being disposed between the first body and the second body; and a first support member and a second support member that separate the plurality of substrates in an optical axis direction, wherein at least one among the plurality of substrates includes a concave part being inwardly recessed on a side surface, and wherein at least one of the first support member and the second support member is in contact with the concave part of the substrate to inhibit the substrate from being separated.

An automobile according to an embodiment of the present invention comprises: a vehicle body; a door being mounted in the vehicle body; a display unit being disposed inside the vehicle body; and the camera module, wherein the camera module is disposed in at least one of the vehicle body and the door and can be electrically connected to the display unit.

Advantageous Effects

Through the present embodiment, the reduction of a component mounting space can be minimized despite the stacked structure of multiple substrates. In particular, compared to a screw-based coupling structure, a wider space for component mounting can be secured.

In addition, the process becomes simplified due to the hook fastening structure so that the process time is minimized, thereby enhancing workability and productivity.

In addition, substrate bending that may occur during the coupling process between pluralities of substrates can be inhibited.

In addition, it can inhibit the substrate from shaking when the camera module vibrates.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the present embodiments, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the present embodiment, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or disposed in "on (above)" or "below (under)" of each component, "on (above)" or "below (under)" means that it includes not only the case where the two components are directly in contact with, but also the case where one or more other components are formed or disposed between the two components. In addition, when expressed as "on (above)" or "below (under) ", the meaning of not only an upward direction but also a downward direction based on one component may be included.

The 'optical axis direction' used below is defined as the optical axis direction of the lens. Meanwhile, 'optical axis direction' may correspond to such as 'up and down direction', 'z-axis direction', and the like.

Hereinafter, the configuration of a camera module according to an embodiment of the present invention will be described with reference to the drawings.

Figure 1:
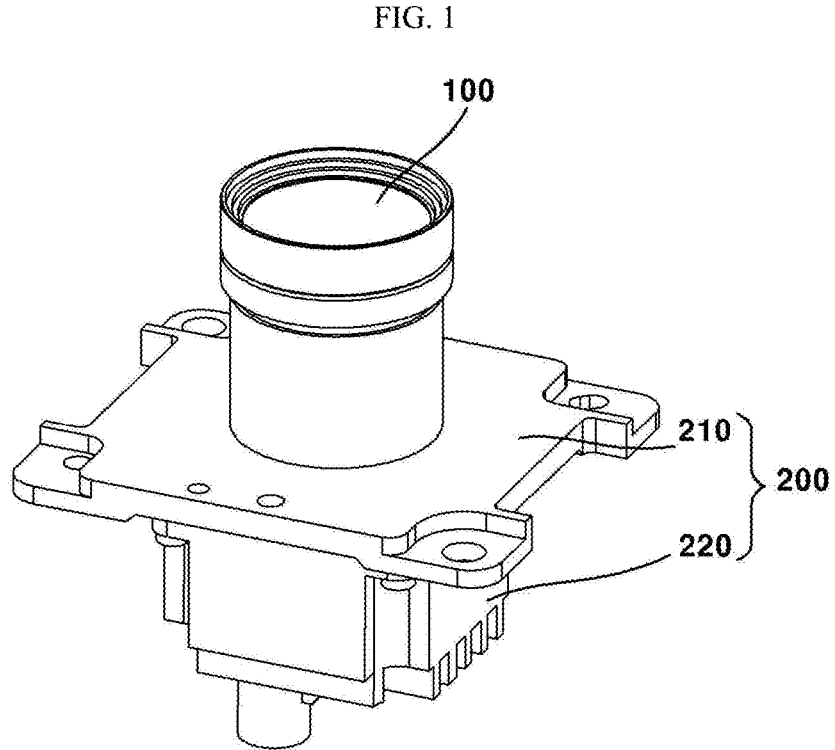
FIG. 1 is a perspective view of a camera module according to an embodiment of the present invention.
Figure 2:
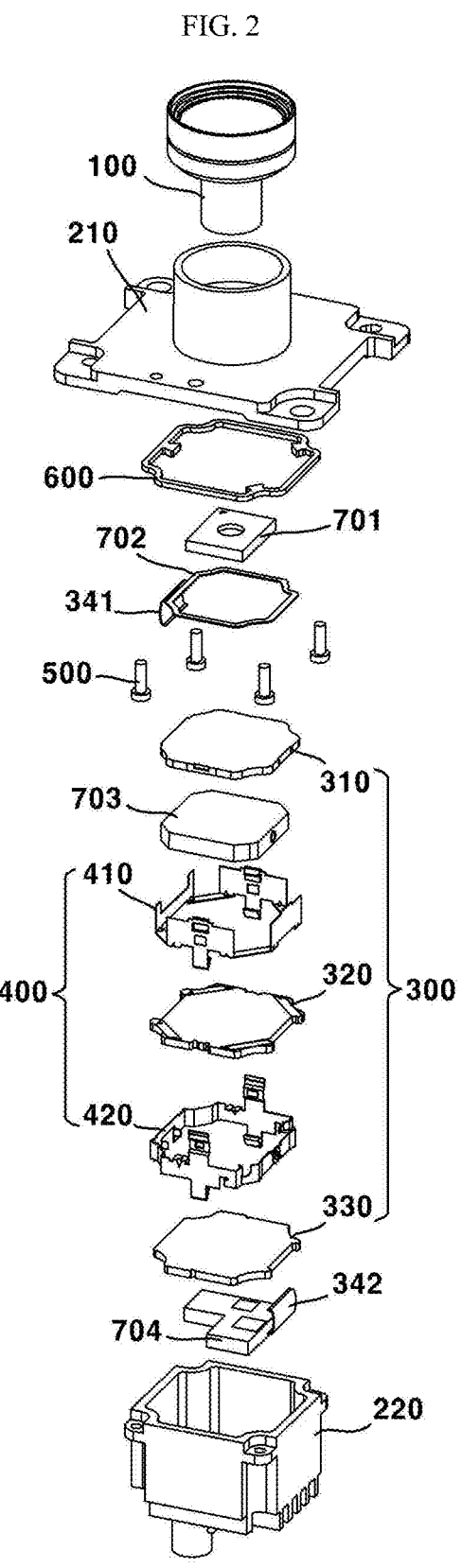
FIG. 2 is an exploded perspective view of a camera module according to an embodiment of the present invention.
Figure 3:
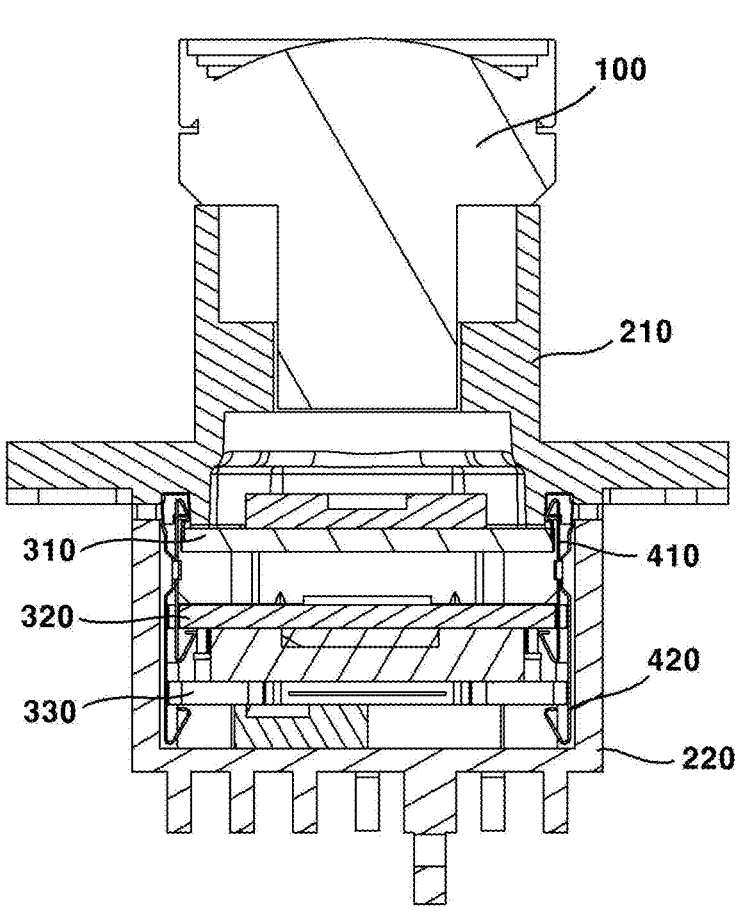
FIG. 3 is a cross-sectional view of a camera module according to an embodiment of the present invention.
Figure 4:
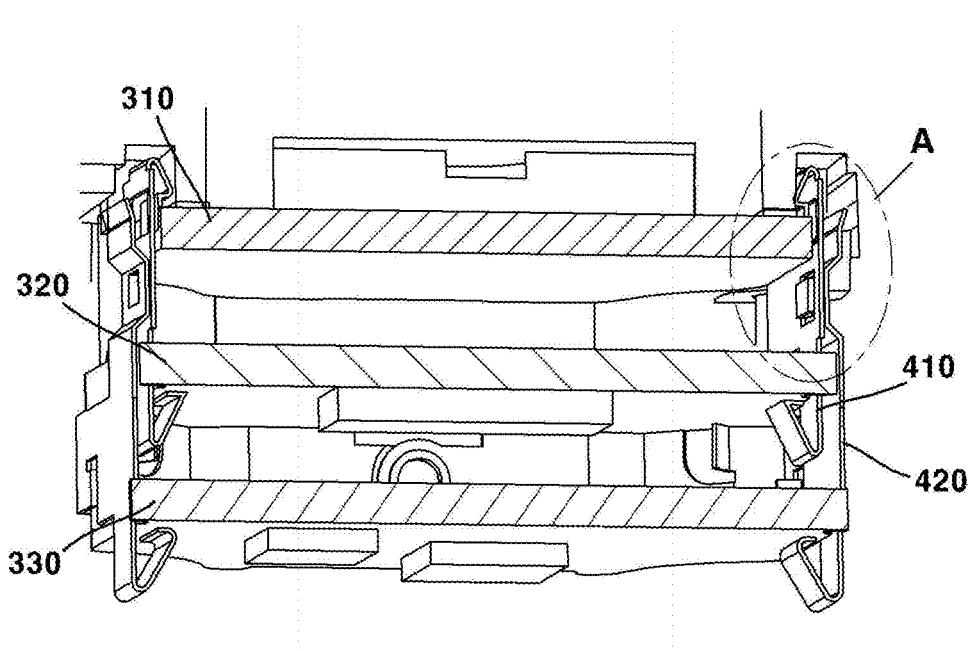
FIG. 4 is an enlarged cross-sectional view of a part of a camera module according to an embodiment of the present invention.
Figure 5:
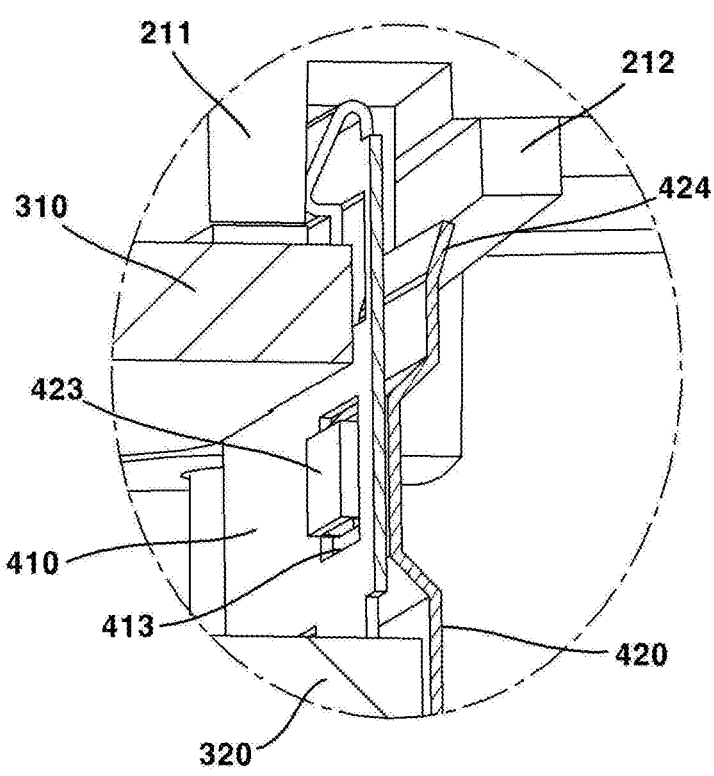
FIG. 5 is an enlarged view of area A shown in FIG. 4.
Figure 6:
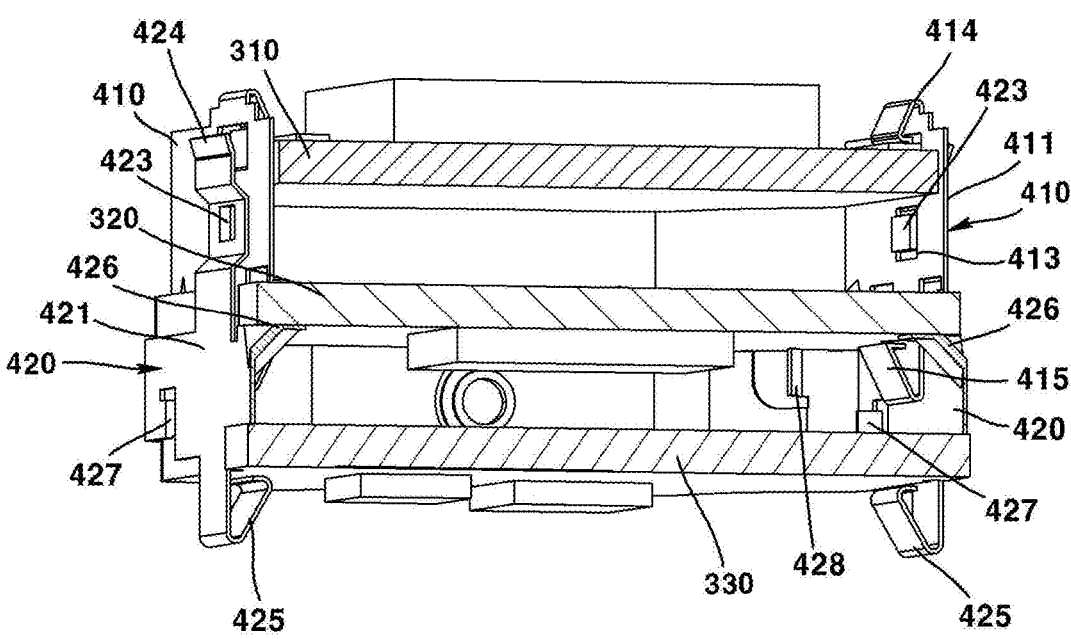
FIG. 6 is an enlarged cross-sectional view of another part of a camera module according to an embodiment of the present invention.
Figure 7:
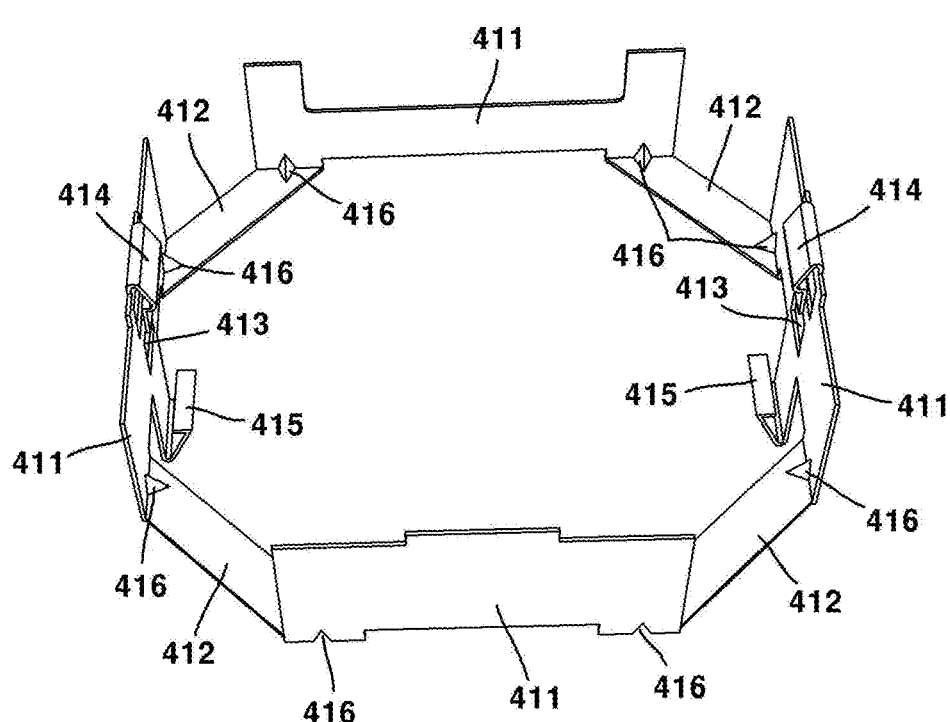
FIG. 7 is a perspective view of the first support member of a camera module according to an embodiment of the present invention.
Figure 8:
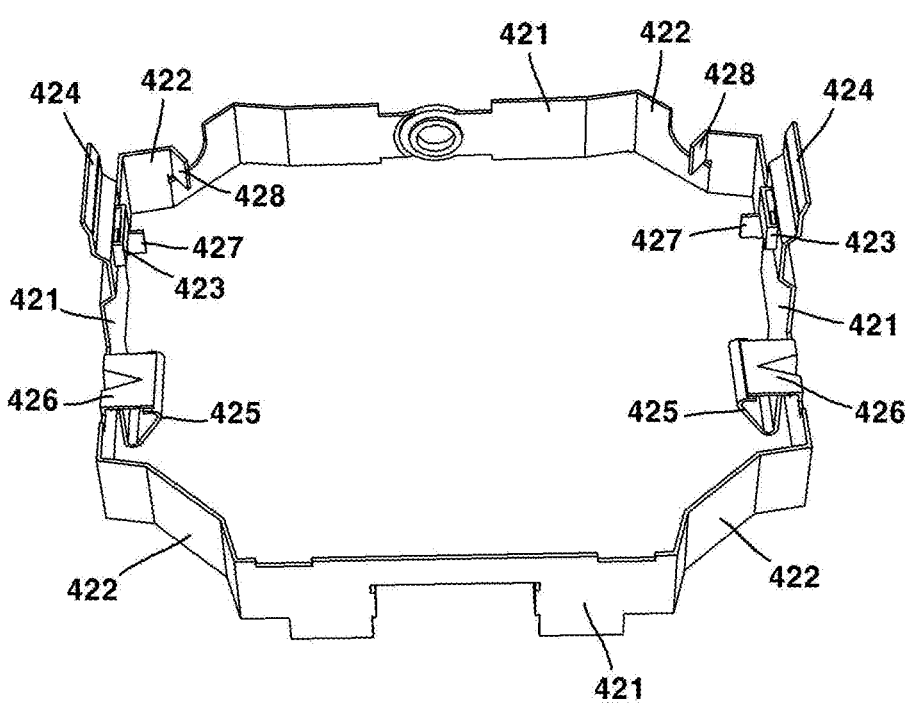
FIG. 8 is a perspective view of a second support member of a camera module according to an embodiment of the present invention.
Figure 9:
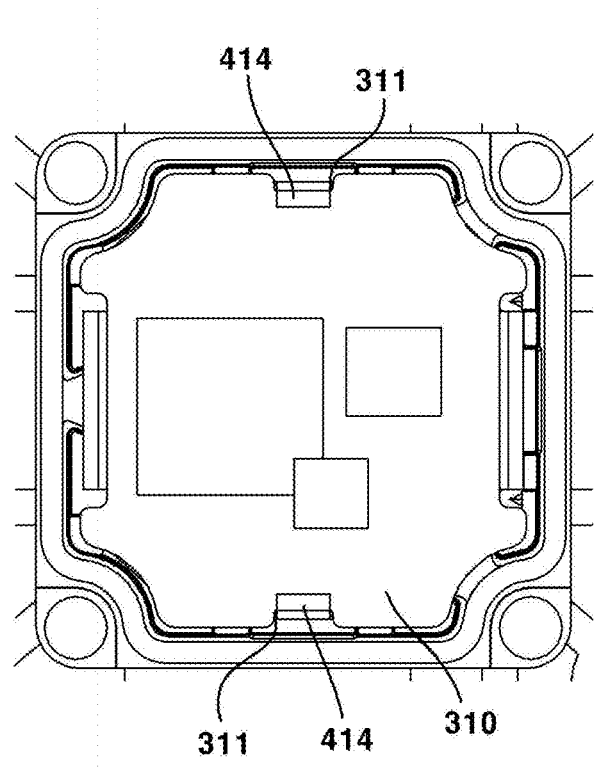
FIG. 9 is a diagram showing a view from the upper side of a first substrate of a camera module according to an embodiment of the present invention.
Figure 10:
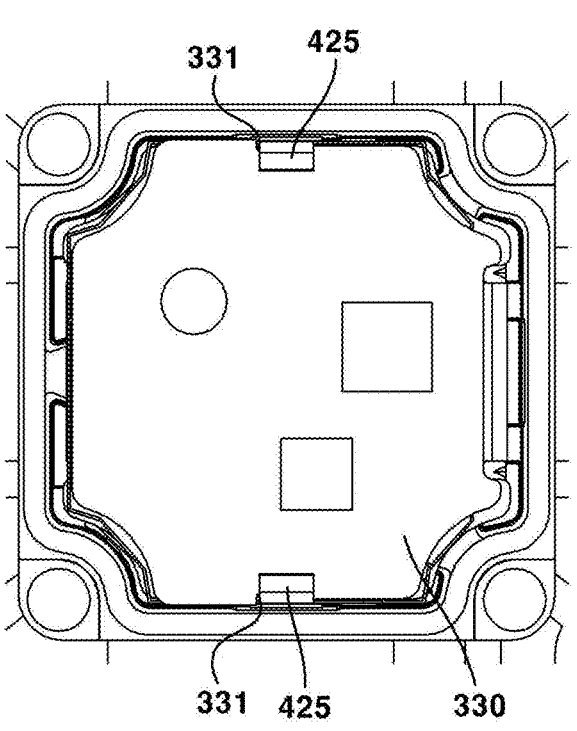
FIG. 10 is a diagram showing a view from the lower side of a third substrate of a camera module according to an embodiment of the present invention.

FIG. 1 is a perspective view of a camera module according to an embodiment of the present invention; FIG. 2 is an exploded perspective view of a camera module according to an embodiment of the present invention; FIG. 3 is a cross-sectional view of a camera module according to an embodiment of the present invention; FIG. 4 is an enlarged cross-sectional view of a part of a camera module according to an embodiment of the present invention; FIG. 5 is an enlarged view of area A shown in FIG. 4; FIG. 6 is an enlarged cross-sectional view of another part of a camera module according to an embodiment of the present invention; FIG. 7 is a perspective view of the first support member of a camera module according to an embodiment of the present invention; FIG. 8 is a perspective view of a second support member of a camera module according to an embodiment of the present invention; FIG. 9 is a diagram showing a view from the upper side of a first substrate of a camera module according to an embodiment of the present invention; and FIG. 10 is a diagram showing a view from the lower side of a third substrate of a camera module according to an embodiment of the present invention.

The camera module according to an embodiment of the present invention may be a vehicle camera module. The camera module may be coupled to the vehicle. The camera module may be used in at least one among a vehicle front camera, a side camera, a rear camera, an in-vehicle driver surveillance camera, and a black box. The camera module may be disposed at the front of the vehicle. The camera module may be disposed at the rear of the vehicle. The camera module may be disposed on the side of the vehicle. A vehicle may include a vehicle body in which a driver rides, a door being mounted on the car body, and a display unit being disposed inside the vehicle body. The camera module may be disposed in at least one of the vehicle body and the door. The camera module may be electrically connected to the display unit.

A camera module according to an embodiment of the present invention may include a body part 200, a plurality of substrates 300, and a support member 400.

The camera module may include a body part 200. The body part 200 may include a first body 210 and a second body 220.

A lens may be disposed in the first body 210.

More specifically, the first body 210 may be referred to as any one among a front housing, a front body, an upper housing, and a first housing. The first body 210 may include a lens. The first body 210 may include a lens barrel. A lens barrel may be disposed on one side of the opening of the first body 210. The lens barrel can accommodate a lens inside. A lens may be disposed in the hole of the lens barrel. The inner surface of the hole of the lens barrel may be formed in a size and shape corresponding to the outer circumferential shape of the lens. The lens barrel and lens may be formed integrally. The first body 210, the lens barrel, and the lens may be formed as one body. The first body 210, the lens barrel, and the lens may be formed separately. The lens may include a plurality of lenses. The lens may be aligned with an image sensor 701. The lens may be optically aligned with the image sensor 701. The optical axis of the lens may coincide with the optical axis of the image sensor 701. The first body 210 may include an infrared filter (IR filter) being disposed between the lens and the image sensor 701.

The second body 220 may be coupled to a lower side of the first body 210.

More specifically, the second body 220 may be referred to as any one among a rear housing, a rear body, a lower housing, and a second housing. The second body 220 may be formed in a square shape with an open upper part. The second body 220 may be formed of a metal material. The second body 220 may be disposed below the first body 210. The second body 220 may be coupled with the first body 210. The second body 220 may form an internal space through the coupling with the first body 210. The second body 220 may include a space part whose upper surface is open.

The lower surface of the first body 210 may include a first boss part 211 being in contact with one surface of the first substrate 310. An adhesive member 702 may be disposed between one surface of the first substrate 310 and the first boss part 211. The adhesive member 702 may be formed in a strip shape corresponding to the shape of the edge of one surface of the first substrate 310. The lower surface of the first body 210 may include a second boss part 212 being in contact with the second body 220. The lower surface of the first body 210 may include: a concave part between the first boss part 211 being in contact with one surface of the first substrate 310; and the second boss part 212 being in contact with the second body 220. The concave part may be a space being formed by the first boss part 211 and the second boss part 212 being protruded from a lower surface of the first body 210.

A sealing member 600 may be disposed between the first body 210 and the second body 220. A sealing member 600 may be disposed in a space formed by the first boss part 211 and the second boss part 212. Foreign substances can be inhibited from entering the internal space of the first body 210 and the second body 220 through the sealing member 600.

The first body 210 and the second body 220 may be coupled through a screw 500. The second body 220 may have a hole where the screw 500 is coupled to the square corner. The first body 210 and the second body 220 may be coupled with an adhesive. The first body 210 and the second body 220 may be coupled with an epoxy.

The second body 220 may include a connector lead-out part on the bottom surface. The connector lead-out part may be coupled to the bottom surface. The connector lead-out part may be disposed in a hole (not shown) in the bottom surface. The connector lead-out part may penetrate a hole in the bottom surface. A connector may be disposed inside the connector lead-out part. The connector lead-out part may be formed of a metal material.

A plurality of substrates 300 may be disposed between the first body 210 and the second body 220.

More specifically, the plurality of substrates 300 may be printed circuit substrates (PCBs). Electronic components may be mounted on at least one of the upper surface and the lower surface of each of the plurality of substrates 300. The plurality of substrates 300 may be rigid substrates. The plurality of substrates 300 may be disposed so that the upper surface and the lower surface face each other.

The plurality of substrates 300 may include first to third substrates 310, 320, and 330 sequentially disposed adjacent to the first body 210. The first substrate 310 is a substrate being disposed closest to the lens, and an image sensor 701 may be mounted on an upper surface of the first substrate 310. A first heat dissipation member 703 may be disposed on a lower surface of the first substrate 310. The first heat dissipation member 703 may allow heat being generated from the image sensor 701 to be discharged. The first heat dissipation member 703 may be disposed on a lower surface of the second substrate 320. The third substrate 330 is a substrate being disposed closest to the bottom surface of the second body 220, a second heat dissipation member 704 may be disposed on the bottom surface of the third substrate 330, and a connector may be coupled thereto. The plurality of substrates 300 may be electrically connected to a connector. This is merely an example, and various electronic components may be mounted on at least one of one side and the other side of the first to third substrates 310, 320, and 330. The third substrate 330 may be disposed to be spaced apart from the bottom surface of the second body 220. At least some of the side surfaces among the plurality of substrates 300 may be in contact with an inner surface of the second body 220. The plurality of substrates 300 may include additional substrates in addition to the first to third substrates 310, 320, and 330.

The plurality of substrates 300 may be electrically connected to each other by flexible substrates being connected to side surfaces. Referring to FIG. 2, the first flexible substrate 341 is fixed to one end of the adhesive member 702, so that the first substrate 310 and the second substrate 320 can be electrically connected to each other. The second flexible substrate 342 is fixed to the second heat dissipation member 704, so that the second substrate 320 and the third substrate 330 can be electrically connected to each other. This is only an example, the first flexible substrate 341 may be connected to the side surface of the first substrate 310 and the side surface of the second substrate 320; and the second flexible substrate 342 may be connected to the side surface of the second substrate 320 and the side surface of the third substrate 330. With respect to the side surface of the second substrate 320, the first flexible substrate 341 and the second flexible substrate 342 may be disposed on opposite sides of each other to avoid mutual interference.

It may include a support member 400 that fixes the plurality of substrates 300 so as to be spaced apart from one another in an optical axis direction.

More specifically, the support member 400 may include a first support member 410 and a second support member 420. The first support member 410 and the second support member 420 may be formed in different shapes. The first support member 410 can fix the first substrate 310 and the second substrate 320 by spacing them apart from each other in an optical axis direction. The second support member 420 can fix the second substrate 320 and the third substrate 330 by spacing them apart from each other in an optical axis direction. The first support member 410 may be disposed more inside than the second support member 420. The second support member 420 may be disposed to surround the outside of at least a part of the first support member 410. The first support member 410 and the second support member 420 may be disposed such that parts are overlapped with each other in a direction perpendicular to the optical axis. A part of the first support member 410 and the second support member 420 may be disposed to be spaced apart in a direction perpendicular to the optical axis.

Hereinafter, the first support member 410 will be described with reference to FIG. 7. The first support member 410 may include a plurality of side walls 411. The plurality of side walls 411 may include a first side wall and a second side wall being disposed to face each other, and a third side wall and a fourth side wall being disposed to face each other and connecting the first side wall and the second side wall. Holes 413 may be formed on side walls of the first support members 410 facing each other. The first side wall and the second side wall of the first support member 410 being disposed to face each other may have holes 413 formed at positions facing each other.

The holes 413 being formed in the plurality of side walls 411 may be formed in a square shape. The hole 413 of the first support member 410 may be formed in a circular shape. The hole 413 of the first support member 410 may be formed into various shapes. A protrusion part 423 being formed in the second support member 420 may be inserted into the hole 413 of the first support member 410. The hole 413 of the first support member 410 may be formed in a shape corresponding to the protrusion part 423 of the second support member 420. In the hole 413 of the first support member 410, the protrusion part 423 being formed in the second support member 420 may be inserted to couple the first support member 410 and the second support member 420, and can be fixed while controlling relative movement in the up/down/left/right directions.

The first support member 410 may include a first hook 414 being extended upward from the side wall 411 and in contact with an upper surface of the first substrate 310. The first hook 414 may be formed in each of the plurality of side walls 411 facing each other. The first hook 414 may be formed in all four side walls 411. The first hook 414 is extended upward from the side wall 411 and is bent inward to form a downwardly inclined surface, and after bending from the end of the downwardly inclined surface toward the inner surface of the side wall, a surface parallel to the side wall may be formed. One end of the first hook 414 may be disposed to be in contact with one surface of the first substrate 310. A part of the first hook 414 may be disposed so as to be in contact with an outer surface of the first boss part 211 of the first body 210. At this time, the first hook 414 contains a material with elastic force and presses the outer surface of the first boss part 211 so that the first support member 410 can be coupled to the first body 210.

The lower surface of the first body 210 may include a concave part between the first boss part 211 being in contact with one surface of the first substrate 310 and the second boss part 212 being in contact with the second body 220. The concave part may be a space being formed by the first boss part 211 and the second boss part 212 being protruded from the lower surface of the first body 210. The first hook 414 of the first support member 410 may be disposed in the concave part of the first body 210. A part of the inclined surface of the first hook 414 may be in contact with an outer surface of the first boss part 211 of the first body 210. The first hook 414 of the first support member 410 is disposed in a concave part formed in the first body 210 to minimize bending deformation of the first support member 410.

The first support member 410 may include a second hook 415 being extended downward from the side wall 411 and in contact with the lower surface of the second substrate 320. The second hook 415 may be formed in each of the plurality of side walls 411 facing each other. The second hook 415 may be formed in each of the four side walls 411. The second hook 415 is extended downward from the side wall 411 and is bent inward to form an upwardly inclined surface, and a curved surface may be formed from the upwardly inclined surface toward the inner surface of the side wall. One end of the second hook 415 has a surface parallel to the second substrate 320 and may be in contact with the second substrate 320. The surface of the second hook 415 parallel to the second substrate 320 may be in contact with the second substrate 320 to fix the second substrate 320.

The first hook 414 and the second hook 415 of the first support member 410 may be formed by being extended from the same side wall. The first hook 414 and the second hook 415 of the first support member 410 may be formed by being extend from different side walls. For example, the first hook 414 of the first support member 410 may be formed by being extended from the first and second side walls facing each other, respectively. Or, the first support member 410 may be formed by being extended from the first and second side walls facing each other, respectively, and the second hook 415 may be formed by being extended from the third and fourth side walls facing each other.

The first support member 410 may include a connection part 412 where adjacent side walls 411 are connected to each other. The connection part 412 may connect the first side wall and the third side wall. The connection part 412 may connect the first side wall and the fourth side wall. The connection part 412 may connect the second side wall and the third side wall. The connection part 412 may connect the second side wall and the fourth side wall. The connection part 412 may be formed as a surface perpendicular to the plurality of side walls 411. The connection part 412 may be formed to be parallel to the substrate 300. The lower surface of the connection part 412 may be in contact with the upper surface of the second substrate 320. The second substrate 320 may be disposed and fixed between the lower surface of the connection part 412 and one surface of the second hook 415.

A groove 416 being inwardly recessed may be formed at the connection part of the connection part 412 and each side wall 411. The groove 416 may be disposed to increase the rigidity of the part where the connection part 412 and the side wall 411 are connected. The groove 416 may be formed into two triangular shapes facing each other. The groove 416 may be formed in a shape in which inclined surfaces being inwardly recessed face each other. The groove 416 may be a shape by bending a part of the surface where the connection part 412 and the side wall 411 meet.

Hereinafter, the second support member 420 will be described with reference to FIG. 8. The second support member 420 may include a plurality of side walls 421. The plurality of side walls 421 may include: a first side wall and a second side wall being disposed to face each other; and a third side wall and a fourth side wall connecting the first side wall and the second side wall and being disposed to face each other. A protrusion part 423 may be formed in the side wall 421 of the second support member 420. A protrusion part 423 may be formed in each of the side walls 421 of the second support member 420 facing each other. Each of the first side wall and second side wall being disposed to face each other of the second support member 420 may have protrusion parts formed at a position where they are facing each other. The surface on which the protrusion part 423 is formed may be disposed between the first substrate 310 and the second substrate 320. The surface on which the protrusion part 423 is formed may be disposed more inside than the side wall 421 of the second support member 420.

The protrusion part 423 being formed in at least one among the plurality of side walls 421 may be protruded in a shape corresponding to the hole 413 being formed in the first support member 410. The protrusion part 423 of the second support member 420 may be formed to be protruded into a square shape. The protrusion part 423 of the second support member 420 may be formed to be protruded in a circular shape. The protrusion part 423 of the second support member 420 may be formed into various shapes. The protrusion part 423 of the second support member 420 may be inserted into the hole 413 of the first support member 410. The protrusion part 423 of the second support member 420 may be inserted into and fixed to the hole 413 of the first support member 410. The protrusion part 423 of the second support member 420 is inserted into the hole 413 of the first support member 410 to inhibit movement of the second support member 420.

An inclined surface inclined in an inward direction may be formed between the surface on which the protrusion part 423 is formed and the side wall of the second support member 420. An inclined part 424 being extended upward from the surface on which the protrusion part 423 is formed may be formed. The inclined part 424 may be formed in an outward direction from the surface on which the protrusion part 423 is formed. The inclined part 424 may comprise: a first surface being extended from the surface on which the protrusion part 423 is formed to form an inclined surface in an outward direction; a second surface being extended upward from the first surface and formed on an imaginary line penetrating the side wall 421; and a third surface being extended from the second surface to form an inclined surface in an outward direction.

One end of the inclined part 424 may be in contact with the inner surface of the second boss part 212 of the first body 210. One end of the inclined part 424 may be in contact with the second boss part 212 of the first body 210, thereby inhibiting the second support member 420 from being bent outward. In addition, the second support member 420 contains an elastic material and can be fixed by pressing the second boss part 212 outward.

The second support member 420 may include a third hook 425 being extended downward from the side wall 421 and in contact with a lower surface of the third substrate 330. The third hook 425 may be formed in each of the plurality of side walls 421 facing each other. The third hook 425 may be formed on each of the four side walls 421. The third hook 425 is extended downward from the side wall 421 and is bent inward to form an upwardly inclined surface, and a curved surface may be formed from the upwardly inclined surface toward the inner surface of the side wall. One end of the third hook 425 has a surface parallel to the third substrate 330 and can be in contact with a lower surface of the third substrate 330. The surface of the third hook 425 parallel to the third substrate 330 may be in contact with the third substrate 330 to fix the third substrate 330. The third hook 425 may have the same shape as the first hook 414 or the second hook 415. The third hook 425 may have a different shape from the first hook 414 and the second hook 415.

The second support member 420 may include a connecting part 422 through which adjacent side walls 421 are connected to each other. The connection part 422 may connect the first side wall and the third side wall. The connection part 422 may connect the first side wall and the fourth side wall. The connection part 422 may connect the second side wall and the third side wall. The connection part 422 may connect the second side wall and the fourth side wall. The connection part 422 of the second support member 420 may have a different shape from the connection part 412 of the first support member 410 and may be formed in a plane perpendicular to the substrate 300. The connection part 422 of the second support member 420 may include a plurality of surfaces connecting adjacent side walls at various angles. For example, the connection part 422 of the second support member 420 may be formed by connecting a surface perpendicular to the side wall 421 and a surface forming an obtuse angle with the side wall. Or, the connection part 422 of the second support member 420 may be formed as a curved surface that is recessed inward.

The second support member 420 may include a locking part 426, 427, 428 being bent inward in at least one side wall 421 and in contact with an upper surface or a lower surface of at least one among the plurality of substrates 300.

More specifically, the second support member 420 may include a first locking part 426 in at least one side wall 421 being bent inward and in contact with one surface of the second substrate 320. The first locking part 426 may be in contact with a lower surface of the second substrate 320 to inhibit movement of the second substrate 320. The first locking part 426 may be formed at the upper end of the side wall 421 of the second support member 420 with a surface perpendicular to the side wall 421. The first locking part 426 may be formed to be parallel to a lower surface of the second substrate 320. The first locking part 426 may have at least one groove being recessed inwardly formed at a part connected to the side wall 421 to reinforce rigidity. The groove may be formed in the shape of two triangular shapes facing each other. The groove may be formed in a shape where inclined surfaces being recessed inward and facing each other.

The second support member 420 may include a second locking part 427 being bent inward in at least one side wall 421 and in contact with one surface of the third substrate 330. The second locking part 427 may be in contact with an upper surface of the third substrate 330 to inhibit movement of the third substrate 330. The second locking part 427 may be formed by cutting at least a part of the side wall 421 of the second support member 420 and bending it inward. The second locking part 427 may be formed as a surface per-pendicular to the side wall 421 of the second support member 420. The second locking part 427 may be disposed perpendicular to an upper surface of the third substrate 330.

At least one connection part 422 of the second support member 420 may include a third locking part 428 being bent inward and in contact with the other surface of the second substrate 320. The third locking part 428 may be in contact with a lower surface of the second substrate 320 to inhibit movement of the second substrate 320. The third locking part 428 may be formed by cutting and bending at least a part of one surface of the connecting part 422 of the second support member 420. The third locking part 428 may be disposed perpendicular to a lower surface of the second substrate 320.

The first to third substrates 310, 320, and 330 may be fixed and spaced apart in an optical axis direction by a structure in which the first support member 410 and the second support member 420 are coupled. The first substrate 310 may be coupled to and fixed to the first boss part 211 of the first body 210. The second substrate 320 can be fixed by being contact with a connection part 412 of the first support member 410, a second hook 415 of the first support member 410, an upper end of the side wall 421 of the second support member 420, a first locking part 426, and a third locking part 428. The third substrate 330 may be fixed by being in contact with a lower end of the side wall 421 of the second support member 420, a third hook 425, and a second locking part 427.

The first substrate 310 may be inserted by pressing downward from the upper side of the first support member 410. The second substrate 320 may be inserted by pressing upward from the lower side of the first support member 410. The second substrate 320 may be inserted by pressing downward from the upper side of the second support member 420. The third substrate 330 may be inserted by pressing downward from the lower side of the second support member 420.

The plurality of substrates 300 may all be formed to have the same shape and size. The plurality of substrates 300 may be formed in different shapes and sizes. The following description of the shape of the substrate may be a description of each of the first to third substrates 310, 320, and 330.

The substrate 300 may include an avoidance part in which four corner side surfaces are rounded and recessed inward. The avoidance part may be formed to avoid a part where the first body 210 and the second body 220 are screw-coupled. The substrate 300 may include: a first side surface and a second side surface being disposed at a side opposite to each other; and a third side surface and fourth side surface connecting the first side surface and second side surface and being disposed at a side opposite to each other.

A concave part being in contact with the inner surface of the hook formed in the support member 400 may be formed on the first side surface and the second side surface of the substrate 300. Referring to FIG. 9, a concave part 311 may be formed on the first side surface and the second side surface of the first substrate 310. The first hook 414 of the first support member 410 may be disposed to pass through the concave part 311 formed in the first substrate 310. Referring to FIG. 10, a concave part 331 may be formed on the first side surface and the second side surface of the third substrate 330. The third hook 425 of the second support member 420 may be disposed to pass through the concave part 331 formed in the third substrate 330. Although not shown, a concave part (not shown) may be formed on the first side surface and the second side surface of the second substrate 320. The second hook 415 of the first support member 410 may be disposed to pass through the concave part of the second substrate 320.

A rib may be formed on the third surface and the fourth side surface of the substrate 300. A protrusion may be formed on both side surfaces of the rib. A flexible substrate 340 may be connected to a rib of different substrate. The rib of the substrate 300 may form a space so that the flexible substrate 340 being connected to the rib can be disposed inside the second body 220.

Although embodiments of the present invention have been described above with reference to the attached draw-ings, those skilled in the art will understand that the present invention can be implemented in other specific forms with-out changing the technical idea or essential features. There-fore, the embodiments described above should be under-stood in all respects as illustrative and not restrictive.

The invention claimed is:

1. A camera module comprising:
a first body comprising a lens;
a second body coupled to the first body;
a first substrate to a third substrate disposed between the first body and the second body; and
a first support member and a second support member configured to space the first to third substrates in an optical axis direction,
wherein the first support member comprises a hole formed in a sidewall thereof,
wherein the second support member comprises a protru-sion part inserted into the hole of the first support member,
wherein the second support member comprises an inclined part extended from the side wall and formed in an outward direction, and
wherein the inclined part of the second support member is caught by a boss that is protruded from the first body.

2. The camera module according to claim 1,
wherein the first support member comprises a first hook extended from the side wall and contacting one surface of the first substrate, and a second hook extended from the side wall and contacting one surface of the second substrate.

3. The camera module according to claim 2,
wherein the first hook is extended upward from the side wall and is bent inward to form a downwardly inclined surface, and after bending from an end of the down-wardly inclined surface toward an inner surface of the side wall, a surface parallel to the side wall is formed.

4. The camera module according to claim 2,
wherein the second hook is extended downward from the side wall and is bent inward to form an upwardly inclined surface, and
wherein one end of the second hook comprises a surface parallel to the second surface and is in contact with the second substrate.

5. The camera module according to claim 1,
wherein the second support member comprises a third hook extended from the side wall and contacting one surface of the third substrate.

6. The camera module according to claim 1,
wherein the first support member comprises a connection part connecting two adjacent side walls, and
wherein a groove that is inwardly recessed is formed at a connection of the side wall and the connection part.

7. The camera module according to claim 1,
wherein the second support member comprises a connec-tion part connecting two adjacent side walls, wherein at least one of the side walls comprises a first locking part that is bent inward and in contact with one surface of the second substrate, and a second locking part that is bent inward and in contact with one surface of the third substrate, and wherein at least one connection part comprises a third locking part that is bent inward and in contact with the other surface of the second substrate.

8. The camera module according to claim 1, wherein at least one among the first to third substrates comprises a concave part being inwardly recessed on a side surface, and wherein at least one of the first support member and the second support member contacts the concave part to inhibit the substrate from being separated.

9. A camera module comprising:

a first body on which a lens is disposed;

a second body coupled to the first body;

a plurality of substrates disposed between the first body and the second body; and a first support member and a second support member separating the plurality of substrates in an optical axis direction, wherein a hook part that presses one side of each substrate in a curved shape toward the inside of the substrate is comprised at one end of each of the first support member and the second support member, wherein the second support member comprises an inclined part extended from the side wall and formed in an outward direction, and wherein the inclined part of the second support member is caught by a boss that is protruded from the first body.

10. The camera module according to claim 9, wherein a hole is formed in the sidewall of the first support member, and wherein the sidewall of the second support member comprises a protrusion part inserted into the hole of the first support member.

11. The camera module according to claim 9, wherein the first support member comprises a connection part connecting two adjacent side walls, and wherein a groove that is inwardly recessed is formed at a connection of the side wall and the connection part.

12. The camera module according to claim 9, wherein the plurality of the substrates comprises a first substrate to a third substrate, and comprising an image sensor disposed on an upper surface of the first substrate.

13. The camera module according to claim 12, wherein at least one among the first to third substrates comprises a concave part inwardly recessed on a side surface, and wherein at least one of the first support member and the second support member contacts the concave part to inhibit the substrate from being separated.

14. A camera module comprising:

a first body on which a lens is disposed;

a second body coupled to the first body;

a plurality of substrates disposed between the first body and the second body; and a first support member and a second support member that separate the plurality of substrates in an optical axis direction, wherein at least one among the plurality of substrates comprises a concave part inwardly recessed on a side surface, wherein at least one of the first support member and the second support member is in contact with the concave part of the substrate to inhibit the substrate from being separated, wherein the second support member comprises an inclined part extended from the side wall and formed in an outward direction, and wherein the inclined part of the second support member is caught by a boss that is protruded from the first body.

15. The camera module according to claim 14, wherein the first support member comprises a connection part connecting two adjacent side walls, and wherein a groove that is inwardly recessed is formed at a connection of the side wall and the connection part.

16. The camera module according to claim 14, wherein the second support member comprises an inclined part extended from the side wall and formed in an outward direction, and wherein the inclined part of the second support member is caught by a boss that is protruded from the first body.

17. The camera module according to claim 14, wherein the plurality of the substrates comprises a first substrate to a third substrate, and comprising an image sensor disposed on an upper surface of the first substrate.

\* \* \* \* \*